United States Patent
Burbidge et al.

(10) Patent No.: US 12,433,314 B2
(45) Date of Patent: Oct. 7, 2025

(54) POWDERED THICKENER MAINTAINING ITS EXTENSIONAL PROPERTIES WHEN RECONSTITUTED AND FOR PROMOTING SAFE SWALLOWING BY INDIVIDUALS WITH DYSPHAGIA

(71) Applicant: SOCIETE DES PRODUITS NESTLE S.A., Vevey (CH)

(72) Inventors: Adam Burbidge, Arzier (CH); Michael Jedwab, Lausanne (CH); Jan Engmann, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 870 days.

(21) Appl. No.: 17/413,078

(22) PCT Filed: Dec. 3, 2019

(86) PCT No.: PCT/EP2019/083461
§ 371 (c)(1),
(2) Date: Jun. 11, 2021

(87) PCT Pub. No.: WO2020/120223
PCT Pub. Date: Jun. 18, 2020

(65) Prior Publication Data
US 2022/0039447 A1    Feb. 10, 2022

Related U.S. Application Data

(60) Provisional application No. 62/779,023, filed on Dec. 13, 2018.

(51) Int. Cl.
*A23L 29/269*     (2016.01)
*A23L 33/125*     (2016.01)

(52) U.S. Cl.
CPC ........... *A23L 29/271* (2016.08); *A23L 33/125* (2016.08); *A23V 2002/00* (2013.01)

(58) Field of Classification Search
CPC ...... A23V 2250/5034; A23V 2200/242; A23V 2200/30; A23L 33/40; A23L 2/52; A23L 33/10; A23L 29/271; A23L 33/125; A23L 33/105; A23L 29/00
See application file for complete search history.

(56) References Cited

U.S. PATENT DOCUMENTS

| | | | |
|---|---|---|---|
| 2003/0165606 A1* | 9/2003 | Lasekan | A23L 33/40 426/590 |
| 2010/0112127 A1 | 5/2010 | Chatel et al. | |
| 2013/0261183 A1* | 10/2013 | Bhagat | G16H 20/60 426/71 |
| 2016/0081923 A1 | 3/2016 | Burbidge et al. | |
| 2016/0192686 A1 | 7/2016 | Burbidge et al. | |

FOREIGN PATENT DOCUMENTS

| | | | |
|---|---|---|---|
| CN | 107495334 A | 12/2017 | |
| JP | 2015091808 A | 5/2015 | |
| WO | 02076244 | 10/2002 | |
| WO | 2008115046 | 9/2008 | |
| WO | 2011152706 | 12/2011 | |
| WO | 2012112421 A1 | 8/2012 | |
| WO | 2013087918 | 6/2013 | |
| WO | 2014154793 | 10/2014 | |
| WO | WO-2016012403 A1 * | 1/2016 | ............... A23L 2/52 |
| WO | 2017207743 | 12/2017 | |
| WO | 2018224589 | 12/2018 | |
| WO | 2018224590 | 12/2018 | |

OTHER PUBLICATIONS

Guleria, Prixit, Suman Kumari, and Nidhi Dangi, B-glucan: Health Benefits and Role in Food Industry—A Review, International Journal of Enhanced Research in Science, Technology & Engineering, ISSN: 2319-7463, vol. 4, Issue 8, Aug. 2015. pp. 255-263. (Year: 2015).*

* cited by examiner

*Primary Examiner* — Hong T Yoo
(74) *Attorney, Agent, or Firm* — K&L Gates LLP

(57) ABSTRACT

A thickening powder promotes safe swallowing of a nutritional product by an individual with dysphagia and can be used in methods of treating dysphagia, promoting safe swallowing of a nutritional product, and mitigating a risk of aspiration during swallowing of a nutritional product. The powder contains beta-glucan and at least one carrier ingredient in an amount that is neutral toward or enhances the extensional properties of the nutritional product. The at least one carrier ingredient can be one or more of maltodextrin, isomaltulose, sucrose or lactose. The powder can be diluted in a diluent to form an aqueous solution that is at least a portion of a nutritional product and to improve the cohesiveness of the nutritional product. Preferably, the resultant nutritional product has a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, when measured at a shear rate of 50 s$^{-1}$ at a temperature of 20° C.

6 Claims, No Drawings

POWDERED THICKENER MAINTAINING ITS EXTENSIONAL PROPERTIES WHEN RECONSTITUTED AND FOR PROMOTING SAFE SWALLOWING BY INDIVIDUALS WITH DYSPHAGIA

CROSS REFERENCE TO RELATED APPLICATIONS

The present application is a National Stage of International Application No. PCT/EP2019/083461, filed on Dec. 3, 2019, which claims priority to U.S. Provisional Patent Application No. 62/779,023, filed on Dec. 13, 2018, the entire contents of which are being incorporated herein by reference.

BACKGROUND

The present disclosure generally relates to a powdered thickener for promoting safe swallowing of a nutritional product by an individual with dysphagia, a method of treating dysphagia by administering a nutritional product made by dilution of a powdered thickener, a method of making a powdered thickener, and a method of improving the cohesiveness of a nutritional product by diluting a powdered thickener. The powdered thickener maintains its extensional properties when reconstituted and preferably provides a high shear viscosity to the resultant nutritional product.

Dysphagia is a medical term for the symptom of difficulty in swallowing. Dysphagia may be a sensation that suggests a difficulty in a passage of a solid or a liquid (i.e., a nutritional product) from the mouth to the stomach.

During processing of a nutritional product in the mouth and during swallowing, a viscosity of the nutritional product changes due to shear forces. In most cases, the viscosity of the nutritional product decreases when the shear forces and the shear rate acting on the nutritional product (e.g., chewing forces) increase. Individuals who suffer from dysphagia often require a thickened nutritional product. Thickening of the nutritional product is achieved to increase, in particular, the shear viscosity of the product by adding a thickener such as a starch or gum thickener. The thickened nutritional product makes an individual with dysphagia less likely to aspirate during passage of the nutritional products from the mouth to the stomach.

Individuals with dysphagia may find that nutritional products cause coughing, spluttering or even choking, and therefore thickened nutritional products enable the individuals who suffer from dysphagia to swallow safely. The addition of a thickener is thought to improve a bolus control and timing of swallowing, but the resultant thickness is disliked by individuals who suffer from dysphagia due to the extra swallowing effort required. Moreover, the thickener leaves residues with high levels of viscosity, resulting in undesirable organoleptic properties. This is particularly relevant for liquids and beverages, as a dysphagia patient would expect a liquid that still has the organoleptic properties of a real thin liquid instead of a liquid product showing high viscosity. Furthermore, thickened nutritional products wherein merely shear viscosity is increased usually lack the cohesiveness that saliva typically provides to food boluses.

Dysphagia is classified into three major types: oropharyngeal dysphagia, esophageal dysphagia and functional dysphagia.

Oropharyngeal dysphagia is generally not treatable with medication. Oropharyngeal dysphagia affects individuals of all ages but is more prevalent in older individuals. Worldwide, oropharyngeal dysphagia affects approximately 22 million people over the age of 50 years. Oropharyngeal dysphagia is often a consequence of an acute event such as a stroke, brain injury, or surgery for oral or throat cancer. In addition, radiotherapy and chemotherapy may weaken the muscles and degrade the nerves associated with the physiology and nervous innervation of the swallow reflex. Oropharyngeal dysphagia is also common for individuals with progressive neuromuscular diseases, such as Parkinson's disease, to experience increasing difficulty in swallowing initiation. Representative causes of oropharyngeal dysphagia include those associated neurological illnesses (brainstem tumors, head trauma, stroke, cerebral palsy, Guillain-Barre syndrome, Huntington's disease, multiple sclerosis, polio, post-polio syndrome, Tardive dyskinesia, metabolic encephalopathies, amyotrophic lateral sclerosis, Parkinson's disease, dementia), infectious illnesses (diphtheria, botulism, Lyme disease, syphilis, mucositis [herpetic, cytomegalovirus, candida, etc.]), autoimmune illnesses (lupus, scleroderma, Sjogren's syndrome), metabolic illnesses (amyloidosis, Cushing's syndrome, thyrotoxicosis, Wilson's disease), myopathic illnesses (connective tissue 15 disease, dermatomyositis, myasthenia gravis, myotonic dystrophy, oculopharyngeal dystrophy, polymyositis, sarcoidosis, paraneoplastic syndromes, inflammatory myopathy), iatrogenic illnesses (medication side effects [e.g., chemotherapy, neuroleptics, etc.], post surgical muscular or neurogenic, radiation therapy, corrosive [pill injury, intentional]), and structural illnesses (cricopharyngeal bar, Zenker's diverticulum, cervical webs, oropharyngeal tumors, osteophytes and skeletal abnormalities, congenital [cleft palate, diverticulae, pouches, etc.]).

Esophageal dysphagia can affect individuals of all ages. Esophageal dysphagia is generally treatable with medications and is considered a less serious form of dysphagia. Esophageal dysphagia is often a consequence of mucosal, mediastinal, or neuromuscular diseases. Mucosal (intrinsic) diseases narrow the lumen through inflammation, fibrosis, or neoplasia associated with various conditions (e.g., peptic stricture secondary to gastroesophageal reflux disease, esophageal rings and webs [e.g., sideropenic dysphagia or Plummer-Vinson syndrome], esophageal tumors, chemical injury [e.g., caustic ingestion, pill esophagitis, sclerotherapy for varices], radiation injury, infectious esophagitis, and eosinophilic esophagitis). Mediastinal (extrinsic) diseases obstruct the esophagus by direct invasion or through lymph node enlargement associated with various conditions (tumors [e.g., lung cancer, lymphoma], infections [e.g., tuberculosis, histoplasmosis], and cardiovascular [dilated auricula and vascular compression]). Neuromuscular diseases may affect the esophageal smooth muscle and its innervation, disrupting peristalsis or lower esophageal sphincter relaxation, or both, commonly associated with various conditions (achalasia [both idiopathic and associated with Chagas disease], scleroderma, other motility disorders, and a consequence of surgery [i.e., after fundoplication and antireflux interventions]). Individuals with intraluminal foreign bodies commonly experience acute esophageal dysphagia.

Functional dysphagia is defined in some patients wherein no organic cause for dysphagia can be found.

Dysphagia is not generally diagnosed. Dysphagia has major consequences on health and healthcare costs on individuals who suffer from dysphagia. Individuals who suffer from severe dysphagia experience a sensation of impaired passage of nutritional products from the mouth to the stomach, occurring immediately after swallowing.

Among community dwelling individuals, perceived symptoms may bring the individuals who suffer from dysphagia to see a doctor. Among institutionalized individuals, health care practitioners may observe symptoms or hear comments from the individual who suffers from dysphagia or a family member suggestive of swallowing impairment and then recommend evaluation of the individual who suffers from dysphagia by a specialist. The general awareness of swallowing impairments is low among front-line practitioners, so dysphagia often is undiagnosed and untreated. Yet, a patient can be clinically evaluated and dysphagia diagnosis can be determined through referral to a swallowing specialist (e.g. speech language pathologist).

The general awareness of swallowing impairments is low among front-line practitioners. Many people (especially those who are elderly) suffer with undiagnosed and untreated swallowing impairments. One reason is that front-line community care practitioners (e.g., general practitioners/geriatricians, home care nurses, physical therapists, etc.) do not typically screen for the condition. If they are aware of the severity of swallowing impairments, they commonly do not use an evidence-based method of screening.

A severity of dysphagia may vary from: (i) minimal (perceived) difficulty in safely swallowing nutritional products, (ii) an inability to swallow nutritional products without significant risk for aspiration or choking, and (iii) a complete inability to swallow nutritional products. An inability to properly swallow nutritional products may be due to food boluses of the nutritional products being broken into smaller fragments, which may enter the airway or leave unwanted residues in the oropharyngeal and/or esophageal tract during the swallowing process (e.g., aspiration). If enough material enters the lungs, the patient may drown on the nutritional products that have accumulated in the lungs. Even small volumes of aspirated nutritional products may lead to bronchopneumonia infection, and chronic aspiration may lead to bronchiectasis and may cause some cases of asthma.

Silent aspiration is a common condition among the elderly and refers to the aspiration of the oropharyngeal contents during sleep. People may compensate for less-severe swallowing impairments by self-limiting the diet. The aging process itself, coupled with chronic diseases such as hypertension or osteoarthritis, predisposes the elderly to subclinical dysphagia that may go undiagnosed and untreated until a clinical complication such as pneumonia, dehydration, malnutrition and related complications occurs.

Dysphagia and aspiration impacts upon quality of life, morbidity and mortality. Twelve-month mortality is high (45%) among individuals in institutional care who have dysphagia and aspiration. The economic burden of the clinical consequences arising from lack of diagnosis and early management of dysphagia are therefore significant.

As noted, pneumonia is a common clinical consequence of dysphagia. Pneumonia may require acute hospitalization and emergency room visits. Among those that develop pneumonia due to aspiration, the differential diagnosis of 'aspiration pneumonia' is not necessarily indicated as a result of current care practices.

Pneumonia is life threatening among persons with dysphagia, and the odds of death within 3 months are about 50% (van der Steen et al. 2002). In addition, an acute insult such as pneumonia often initiates the downward spiral in health among elderly. An insult is associated with poor intakes and inactivity, resulting in malnutrition, functional decline, and frailty. Specific interventions (e.g., to promote oral health, help restore normal swallow, or reinforce a swallow-safe bolus) would benefit persons at risk for (due to aspiration of oropharyngeal contents, including silent aspiration) or experiencing recurrent pneumonia.

Similar to pneumonia, dehydration is a life-threatening clinical complication of dysphagia. Dehydration is a common co-morbidity among hospitalized individuals with neurodegenerative diseases (thus, likely to have a swallowing impairment). Nevertheless, dehydration is an avoidable clinical complication of dysphagia. This underlines the need for thin liquids that can be safely consumed and are organoleptically acceptable for people with dysphagia.

Malnutrition and related complications (e.g., [urinary tract] infections, pressure ulcers, increased severity of dysphagia [need for more-restricted food options, tube feeding, and/or Percutaneous Endoscopic Gastrostomy (PEG) tube placement and reduced quality of life], dehydration, functional decline and related consequences [falls, dementia, frailty, loss of mobility, and loss of autonomy]) can arise when swallowing impairment leads to fear of choking on food and liquids, slowed rate of consumption, and self-limited food choices. If uncorrected, inadequate nutritional intake exacerbates dysphagia as the muscles that help facilitate normal swallow weaken as physiological reserves are depleted. Malnutrition is associated with having more than 3-times greater risk of infection. Infections are common in individuals with neurodegenerative diseases (thus, likely to have a chronic swallowing impairment that jeopardizes dietary adequacy).

Malnutrition has serious implications for patient recovery. Malnourished patients have longer length of hospital stay, are more likely to be re-hospitalized, and have higher costs for hospital care. Furthermore, malnutrition leads to unintentional weight loss and predominant loss of muscle and strength, ultimately impairing mobility and the ability to care for oneself. With the loss of functionality, caregiver burden becomes generally more severe, necessitating informal caregivers, then formal caregivers, and then institutionalization. However, malnutrition is an avoidable clinical complication of dysphagia.

Among persons with neurodegenerative conditions (e.g., Alzheimer's disease), unintentional weight loss (a marker of malnutrition) precedes cognitive decline. In addition, physical activity can help stabilize cognitive health. Thus, nutritional adequacy is important among persons with neurodegenerative conditions to help them have the strength and endurance to participate in regular therapeutic exercise and guard against unintentional weight loss, muscle wasting, loss of physical and cognitive functionality, frailty, dementia, and progressive increase in caregiver burden.

Falls and related injuries are a special concern among elderly with neurodegenerative conditions, associated with loss of functionality. Falls are the leading cause of injury deaths among older adults. Falls are reasonably preventable reason by applying evidence-based practices including medical nutrition therapy as nutritional interventions are efficacious in the prevention of falls and related injuries (e.g., fractures) among the elderly.

Chewing and swallowing difficulties are recognized risk factors for pressure ulcer development. Pressure ulcers are considered an avoidable medical error, preventable within reason by applying evidence-based practices (including nutritional care, as pressure ulcers are more likely when nutrition is inadequate). Pressure ulcers are reasonably preventable, in part, by assuring nutritional intakes are adequate. Furthermore, specific interventions including the use of specialized nutritional supplements help reduce the expected time to heal pressure ulcers once they have developed.

SUMMARY

As set forth in co-pending application U.S. Ser. No. 15/327,745, published as WO2016/012403 and herein incorporated by reference in its entirety, the inclusion of a beta-glucan in a nutritional product surprisingly achieves a similar or identical (possibly even enhanced) effect of increasing the cohesiveness of the food bolus (e.g., for patients who have compromised secretion of saliva). However, the present inventors discovered that dosing a beta-glucan as a rheology modifier to achieve a target extensional viscosity in nutritional formulations is very challenging (both for liquid or powder as a modifier) because the quantity needed to achieve significant extensional behavior is quite low (few wt. %). For this reason, the present inventors identified at least one carrier ingredient, such as one or more of maltodextrin, isoamaltulose, sucrose, or lactose, that is either neutral toward or enhances the extensional properties of the final product. To the best knowledge of the inventors, no commercial solution providing high extensional viscosity to a nutritional product in a controlled way for safe swallowing is available for patients. The powdered thickener maintains its extensional properties when reconstituted and preferably provides a high shear viscosity to the resultant nutritional product.

Accordingly, in a general embodiment, the present disclosure provides a thickening powder formulated for dilution in a diluent (e.g., water) to form an aqueous solution that is at least a portion of a nutritional product, the thickening powder comprising an amount of beta-glucan and at least one carrier ingredient that is neutral toward or enhances extensional properties of the nutritional product and provides to the nutritional product a shear viscosity greater than 200 mPas and up to about 2,000 mPas at a shear rate of 50 $s^{-1}$ at 20° C.

In an embodiment, the diluting of the thickening powder comprises diluting the thickening powder at a diluent:powder weight ratio up to 200:1, preferably 50:1 to 100:1.

In an embodiment, the at least one carrier ingredient is selected from the group consisting of maltodextrin, isomaltulose, sucrose, lactose, and combinations thereof.

In an embodiment, the thickening powder consists of the beta-glucan and the at least one carrier ingredient.

In an embodiment, the thickening powder comprises the at least one carrier ingredient and the beta-glucan in a weight ratio of about 10:1 to about 300:1.

In an embodiment, the amount of the aqueous solution in the nutritional product provides to the nutritional product a relaxation time determined by a Capillary Breakup Extensional Rheometry (CaBER) experiment of about 10 to about 2,000 milliseconds (ms) measured at 20° C.

In an embodiment, the at least one carrier ingredient is selected from the group consisting of (i) maltodextrin and optionally additionally at least one of sucrose or lactose and (ii) isomaltulose and optionally additionally at least one of sucrose or lactose.

In another embodiment, the present disclosure provides a nutritional product made by diluting in a diluent (e.g., water) a thickening powder comprising beta-glucan and at least one carrier ingredient to form an aqueous solution, the nutritional product comprising an amount of the aqueous solution that is neutral toward or enhances extensional properties of the nutritional product and provides to the nutritional product a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, all values measured at a shear rate of 50 $s^1$ at 20° C.

In an embodiment, the nutritional product is a liquid, preferably a thin liquid composition.

In another embodiment, the present disclosure provides a method of making a nutritional product. The method comprises forming at least a portion of the nutritional product by diluting in a diluent (e.g., water) a thickening powder comprising a beta-glucan and at least one carrier ingredient to form an aqueous solution, the aqueous solution is present in the nutritional product in an amount that is neutral toward or enhances the extensional properties of the nutritional product and provides to the nutritional product a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, all values measured at a shear rate of 50 $s^1$ at 20° C.

In another embodiment, the present disclosure provides a method of treating a swallowing disorder in an individual having the swallowing disorder. The method comprises orally administering to the individual a nutritional product made by diluting in a diluent (e.g., water) a thickening powder comprising beta-glucan and at least one carrier ingredient to form an aqueous solution, the aqueous solution is present in the nutritional product in an amount that is neutral toward or enhances extensional properties of the nutritional product and provides to the nutritional product a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, all values measured at a shear rate of 50 $s^1$ at 20° C. In some embodiments, the diluting of the thickening powder is part of the method.

In another embodiment, the present disclosure provides a method of promoting safe swallowing of a nutritional product in an individual in need thereof. The method comprises adding to the nutritional product an aqueous solution made by diluting in a diluent (e.g., water) a thickening powder comprising a beta-glucan and at least one carrier ingredient to form an aqueous solution, the aqueous solution added to the nutritional product in an amount that is neutral toward or enhances extensional properties of the nutritional product and provides to the nutritional product a shear viscosity greater than 200 mPas and up to about 2,000 mPas at a shear rate of 50 $s^{-1}$ at 20° C.; and orally administering to the individual the nutritional product to which the aqueous solution has been added. In some embodiments, the diluting of the thickening powder is part of the method.

In another embodiment, the present disclosure provides a method of mitigating a risk of aspiration during swallowing of a nutritional product in an individual in need thereof. The method comprises adding to the nutritional product an aqueous solution made by diluting in a diluent (e.g., water) a thickening powder comprising a beta-glucan and at least one carrier ingredient, the aqueous solution added to the nutritional product in an amount that is neutral toward or enhances extensional properties of the nutritional product and provides to the nutritional product a shear viscosity greater than 200 mPas and up to about 2,000 mPas at a shear rate of 50 $s^{-1}$ at 20° C.; and orally administering to the individual the nutritional product to which the aqueous solution has been added. In some embodiments, the diluting of the thickening powder is part of the method.

In another embodiment, the present disclosure provides a method for improving the cohesiveness of a nutritional product. The method comprises forming at least a portion of the nutritional product by diluting in a diluent (e.g., water) a thickening powder comprising a beta-glucan and at least one carrier ingredient to form an aqueous solution, the aqueous solution is present in the nutritional product in an amount that is neutral toward or enhances the extensional properties of the nutritional product and provides to the nutritional product a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, all values measured at a shear rate of 50 $s^1$ at 20° C.

In another embodiment, the present disclosure provides a method of making a thickening powder formulated for dilution into at least a portion of a nutritional product, the thickening powder comprising a beta-glucan and at least one carrier ingredient in an amount that is neutral toward or enhances extensional properties of the nutritional product. The method comprises: extracting the beta-glucan from a source selected from the group consisting of cereal, mushroom, yeast, seaweed, algae and mixtures thereof; and at least one step selected from the group consisting of (i) adding the at least one carrier ingredient to the source before the extracting of the beta-glucan from the source and (ii) adding the at least one carrier ingredient to the beta-glucan after the extracting of the beta-glucan from the source, the thickening powder comprising the beta-glucan and the at least one carrier ingredient in an amount that is neutral toward or enhances extensional properties of the nutritional product and provides to the nutritional product a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, all values measured at a shear rate of 50 $s^1$ at 20° C.

An advantage of one or more embodiments provided by the present disclosure is a nutritional product with a high shear viscosity that promotes safer swallowing of boluses of a nutritional product in an individual suffering from dysphagia by using a nutritional product with a high shear viscosity.

Another advantage of one or more embodiments provided by the present disclosure is a nutritional product with a high shear viscosity that improves the lives of a large and growing number of individuals who suffer from dysphagia.

Yet another advantage of one or more embodiments provided by the present disclosure is a nutritional product with a high shear viscosity that supports specific interventions (e.g., to promote oral health, help restore normal swallowing, or reinforce a swallow-safe bolus) that can enable individuals to eat orally instead of being tube fed and/or requiring PEG placement and experience the psychosocial aspects of nutritional products associated with general well-being while guarding against the potentially negative consequences that result from lack of adequate swallowing ability.

Still another advantage of one or more embodiments provided by the present disclosure is a nutritional product with a high shear viscosity that improves the intake of nutritional products by individuals who suffer from dysphagia and thus enable such individuals to swallow a wider variety of nutritional products safely and comfortably, which may lead to an overall healthier condition of the individual and prevent further health-related decline.

Furthermore, another advantage of one or more embodiments provided by the present disclosure is a nutritional product with a high shear viscosity that provides natural cohesiveness typically provided by saliva to food boluses of nutritional products when being consumed by an individual.

Moreover, another advantage of one or more embodiments provided by the present disclosure is to modify rheological properties of a nutritional product to prevent bolus penetration and aspiration.

Another advantage of one or more embodiments provided by the present disclosure is a nutritional product with a high shear viscosity and having cohesiveness akin to saliva produced in the mouth and thus providing a more natural sensation to individuals who suffer from dysphagia.

Yet another advantage of one or more embodiments provided by the present disclosure is a nutritional product with a high shear viscosity but devoid of the thickened sensation from conventional thickeners because one or more embodiments provided by the present disclosure leave no residue in the mouth of the individuals who suffer from dysphagia. This advantage is particularly relevant for liquid products that are intended to maintain their thin liquid properties.

Still another advantage of one or more embodiments provided by the present disclosure is a nutritional product with a high shear viscosity but having organoleptic properties superior to known thickened nutritional products.

Furthermore, another advantage of one or more embodiments provided by the present disclosure is a nutritional product with a high shear viscosity that improves cohesion of food boluses to prevent a food bolus from being broken into smaller fragments which may enter the airway or leave unwanted residues in the oropharyngeal and/or esophageal tract during the swallowing process.

Moreover, another advantage of one or more embodiments provided by the present disclosure is a nutritional product with a high shear viscosity that reduces swallowing effort for individuals who suffer from dysphagia.

Another advantage of one or more embodiments provided by the present disclosure is a nutritional product with a high shear viscosity that reduces the risk of residue build-up in the oropharyngeal and/or esophageal tracts of a dysphagia patient.

Yet another advantage of one or more embodiments provided by the present disclosure is a nutritional product with a high shear viscosity that increases cohesiveness and improves nutritional intake for individuals who suffer from dysphagia by enabling the individuals to swallow a wider variety of food and beverage products safely and comfortably, e.g., by improving bolus integrity ("cohesiveness") and thus lending confidence to the individuals who suffer from dysphagia that the individual is able to consume a wider range of products.

Still another advantage of one or more embodiments provided by the present disclosure is a nutritional product with a high shear viscosity that improves ability and efficiency to swallow and thus improved safety through reduced risk of pulmonary aspiration.

Furthermore, another advantage of one or more embodiments provided by the present disclosure is a nutritional product with a high shear viscosity that enables greater independence from feeding assistance and/or reduced length of time spent in feeding-assistance during meal consumption.

Additional features and advantages are described herein and will be apparent from the following FIGURES and Detailed Description.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

All percentages expressed herein are by weight of the total weight of the composition unless expressed otherwise. Weight by total solids as noted as "% TS."

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "an ingredient" or "the ingredient" includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. A composition "consisting essentially of" contains at least 75 wt. % of the referenced components, preferably at least 85 wt. % of the referenced components, more preferably at least 90 wt. % of the referenced components, most preferably at least 95 wt. % of the referenced components.

The term "and/or" used in the context of "X and/or Y" should be interpreted as "X," or "Y," or "X and Y." Where used herein, the terms "example" and "such as," particularly when followed by a listing of terms, are merely exemplary and illustrative and should not be deemed to be exclusive or comprehensive.

As used herein, a "powder" is a solid that is formulated to be diluted before administration. Further in this regard, the powders disclosed herein are only administered after addition of another ingredient, such as a liquid diluent, preferably water. Moreover, the term "nutritional product" refers to a nutritional composition for oral administration by an individual who suffers from dysphagia. The nutritional product is envisaged for supplemental nutrition, for hydration, or for replacement of one or more full meals of the individual who suffers from dysphagia. The nutritional product is also understood to include any number of optional ingredients (e.g., ingredients additional to the liquid concentrate from which the nutritional product is made). Non-limiting examples of suitable optional ingredients include conventional food additives, for example one or more, acidulants, additional thickeners, buffers or agents for pH adjustment, chelating agents, colorants, emulsifiers, excipient, flavour agent, minerals, osmotic agents, a pharmaceutically acceptable carrier, preservatives, stabilisers, sugar(s), sweetener(s), texturiser(s), and/or vitamin(s). The optional ingredients can be added in any suitable amount. Preferably, the nutritional product is a homogeneous single phase beverage comprising water. Nevertheless, the present disclosure is not limited to a specific embodiment of the nutritional product. Furthermore, the present disclosure is not limited to a specific embodiment of the diluent in which the powder is reconstituted, and the diluent can be any liquid suitable for consumption by an animal or human.

A "ready to drink" beverage or "RTD" beverage is a beverage in liquid form that can be consumed without further addition of liquid. Preferably an RTD beverage is aseptic.

An "oral nutrition supplement" or "ONS" is a composition comprising at least one macronutrient and/or at least one micro nutrient, for example in a form of sterile liquids, semi-solids or powders, and intended to supplement other nutritional intake such as that from food. Non-limiting examples of commercially available ONS products include MERITENE®, BOOST®, NUTREN® and SUSTAGEN®.

The term "unit dosage form," as used herein, refers to physically discrete units suitable as unitary dosages for human and animal subjects, each unit containing a predetermined quantity of the composition disclosed herein in an amount sufficient to produce the desired effect, preferably in association with a pharmaceutically acceptable diluent, carrier or vehicle. The specifications for the unit dosage form depend on the particular compounds employed, the effect to be achieved, and the pharmacodynamics associated with each compound in the host. In an embodiment, the unit dosage form can be a predetermined amount of powder in a sachet.

"Prevention" includes reduction of risk and/or severity of a condition or disorder. The terms "treatment," "treat," "attenuate" and "alleviate" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder, and include treatment of patients at risk of contracting a disease or suspected to have contracted a disease, as well as patients who are ill or have been diagnosed as suffering from a disease or medical condition. The term does not necessarily imply that a subject is treated until total recovery. These terms also refer to the maintenance and/or promotion of health in an individual not suffering from a disease but who may be susceptible to the development of an unhealthy condition. These terms are also intended to include the potentiation or otherwise enhancement of one or more primary prophylactic or therapeutic measure. The terms "treatment," "treat," "attenuate" and "alleviate" are further intended to include the dietary management of a disease or condition or the dietary management for prophylaxis or prevention a disease or condition. A treatment can be patient- or doctor-related.

The term "individual" means any animal, including humans, that could suffer from cognitive aging and thus benefit from one or more of the methods disclosed herein. Generally, the individual is a human or an avian, bovine, canine, equine, feline, hicrine, lupine, murine, ovine or porcine animal. A "companion animal" is any domesticated animal, and includes, without limitation, cats, dogs, rabbits, guinea pigs, ferrets, hamsters, mice, gerbils, horses, cows, goats, sheep, donkeys, pigs, and the like. Preferably, the individual is a human or a companion animal such as a dog or cat.

As used herein, an "effective amount" is an amount that prevents a deficiency, treats a disease or medical condition in an individual or, more generally, reduces symptoms, manages progression of the diseases or provides a nutritional, physiological, or medical benefit to the individual. The relative terms "promote," "improve," "increase," "enhance" and the like refer to the effects of a nutritional product comprising the thickening powder disclosed herein relative to a nutritional product lacking the thickening powder, but otherwise identical.

A "beta-glucan" and a "β-glucan" refer to homopolysaccharides of D-glucopyranose monomers linked by (1→3), (1→4) glycosidic bonds. Beta-glucan is derivable from plant or microbial origin, e.g. from cereal (e.g., oats, barley), certain types of mushrooms (e.g., reishi, shiitake, maitake), yeasts, seaweed, and algae, by methods known to the skilled person, for example as described by Lazaridou et al. in "A comparative study on structure-function relations of mixed-linkage (1→3), (1→4) linear β-D-glucans" in Food Hydrocolloids, 18 (2004), 837-855.

"Isomaltulose" is 6-O-α-D-Glucopyranosyl-D-fructose and is also known as Palatinose™.

The term "maltodextrin" refers to polysaccharides that consist of D-glucose units connected in chains of variable length. The glucose units are primarily linked via α (1→4) glycosidic bonds. Maltodextrins are classified by DE (dextrose equivalent), and have a DE between 3 and 20.

As used herein, a "high shear viscosity" is a shear viscosity greater than 200 mPas measured at a shear rate of 50 $s^1$ and 20° C.

Embodiments

In an aspect of the present disclosure, a thickening powder can be diluted in a diluent (e.g., water) to form at least a portion of a nutritional product (e.g., a water-based beverage, such as a thin liquid). The powder comprises a beta-glucan and at least one carrier ingredient in an amount that is neutral toward or enhances the extensional properties of the nutritional product. The at least one carrier ingredient is preferably selected from the group consisting of maltodextrin, isomaltulose, sucrose, lactose and combinations thereof, for example isomaltulose alone or in combination with sucrose and/or lactose, as another example maltodextrin alone or in combination with sucrose and/or lactose.

The beta-glucan can be present in the nutritional product in an amount that provides to the nutritional product a shear viscosity greater than 200 mPas and up to about 2,000 mPas, preferably greater than 200 mPas and up to about 500 mPas, more preferably 250 mPas to about 450 mPas, most preferably 250 mPas to about 400 mPas, all values measured at a shear rate of 50 $s^1$ at 20° C. In some embodiments, the shear viscosity provided by the beta-glucan to the nutritional product can be about 350 mPas or about 400 mPas at a shear rate of 50 $s^1$ at 20° C.

It is appreciated that measurement of shear viscosity can be performed at a different shear rate, for example another shear rate from 0 to 100 $s^{-1}$, or at different temperature, for example another temperature from 0 to 100° C. Nevertheless, such measurements must be related back to the standard conditions of 50 $s^{-1}$ at 20° C. disclosed herein.

Preferably, the beta-glucan can be present in the nutritional product in an amount that provides to the nutritional product a relaxation time determined by a Capillary Breakup Extensional Rheometry (CaBER) experiment of about 10 to about 2,000 milliseconds (ms), preferably about 20 ms to about 1,000 ms, more preferably about 50 ms to about 500 ms, and most preferably from about 100 ms to about 200 ms, all values measured at a temperature of 20° C.

In an embodiment, the thickening powder comprises the at least one carrier ingredient and the beta-glucan in a weight ratio of about 10:1 to about 300:1, preferably about 20:1 to about 200:1, more preferably about 20:1 to about 150:1 (e.g., about 150:1), most preferably about 20:1 to about 100:1.

In an embodiment, the thickening powder comprises the at least one carrier ingredient and an oat extract containing a beta-glucan in a weight ratio of about 1:1 to about 30:1, preferably about 2:1 to about 20:1, more preferably about 2:1 to about 15:1 (e.g., about 15:1), most preferably about 2:1 to about 10:1, for example for an oat extract containing 14% beta-glucan. Preferably, the oat extract contains 10% to 18%, 12% to 16%, or more preferably 14% beta-glucan.

Preferably the nutritional product resulting from dilution of the powder is a beverage having a nectar consistency. More preferably, the nutritional product resulting from dilution of the powder is a beverage having a water-like consistency.

In some embodiments, the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

To form the powder, a composition comprising the beta-glucan can be spray-dried, freeze-dried or subjected to any other procedure of drying known in the art. Additionally or alternatively, the powder can be made by dry mixing.

In some embodiments, the powder can be provided to the consumer in a container (e.g., a sealed container) for reconstitution in the container and/or for allowing the user to pour the powder from the container into a drinking receptacle in which the powder is reconstituted. Non-limiting examples of suitable containers include bags, boxes, cartons, bottles, or combinations thereof. Preferred containers include a sachet/stick pack, i.e., a small disposable pouch, typically of flexible film such as cellophane or paper, preferably capable of being torn open at one or both ends, and containing one serving of the nutritional product.

In some embodiments, the thickening powder is in a unit dosage form comprising an amount of the thickening powder effective for administration of the nutritional product to an individual who suffers from dysphagia to achieve at least one of (i) supplemental nutrition, (ii) hydration and (ii) replacement of one or more full meals.

In an embodiment, the powder does not contain any protein. In an embodiment, the powder does not contain any fat or oil. In an embodiment, the powder does not contain any carbohydrate additional to the at least one carrier ingredient. For example, the powder can consist essentially of or consist of the beta-glucan and the at least one carrier ingredient.

In another aspect, a method of treating a swallowing disorder in an individual having the swallowing disorder comprises administering to the individual a nutritional product comprising a diluted powder comprising a beta-glucan and at least one carrier ingredient in an amount that is neutral toward or enhances the extensional properties of the nutritional product. In a further aspect, a method of mitigating the risk of aspiration during swallowing of a nutritional product in an individual having dysphagia comprises administering to the individual the nutritional product, and the nutritional product comprises a diluted powder comprising a beta-glucan and at least one carrier ingredient in an amount that is neutral toward or enhances the extensional properties of the nutritional product.

A beta-glucan and hence also oat show particularly preferable properties in the powder because small amounts of a beta-glucan can provide advantageous shear viscosities and relaxation times. Preferably, the shear viscosities are low and the relaxation times are long. The shear viscosity of a product is determined by any method that can accurately control the shear rate applied to the product and simultaneously determine the shear stress or vice versa. Standard methods include the use of concentric cylinders, cone-and-plate and plate-plate geometries. Relaxation times can be determined in this context by a Capillary Breakup Extensional Rheometry (CaBER) as known in the art. The shear viscosity of a product is measured at the same temperature as the relaxation time.

Shear viscosity is a measurable rheological property. Shear viscosity is often referenced as viscosity and describes the reaction of a material to applied shear stress. In other words, shear stress is the ratio between "stress" (force per unit area) exerted on the surface of a fluid, in the lateral or horizontal direction, to the change in velocity of the fluid as you move down in the fluid (a "velocity gradient"). The shear viscosity confers the thickened sensation to a product.

Another rheological property of a material is its extensional viscosity. Extensional viscosity is the ratio of the stress required to extend a liquid in its flow direction to the extension rate. Extensional viscosity coefficients are widely used for characterizing polymers, where they cannot be simply calculated or estimated from the shear viscosity. Rheological studies are generally performed using rheometers, which generally impose a specific stress field or deformation to the fluid and monitor the resultant deformation or stress. These instruments may operate in steady flow or oscillatory flow, as well as both shear and extension. The extensional viscosity may provide a product with an increased cohesiveness without the provision of a thickened sensation.

The nutritional product is preferably orally administrable, for example as one or more of a pharmaceutical formulation, a nutritional product, a dietary supplement, a functional food or a beverage product.

In a further aspect, a method for improving the cohesiveness of a nutritional product comprises adding a diluted powder comprising a beta-glucan and at least one carrier ingredient that is a carbohydrate that is neutral toward or enhances the extensional properties of the nutritional product to one or more ingredients of the nutritional product. The nutritional product can be a nutritional product, and the one or more ingredients of the nutritional product can be selected from the group consisting of a protein, an amino acid, a fat, a carbohydrate, a prebiotic, a probiotic, a fatty acid, a phytonutrient, an antioxidant, and/or combinations thereof.

The protein in the nutritional product can be one or more of a dairy-based protein, a plant-based protein or an animal-based protein. Non-limiting examples of suitable dairy-based protein include casein, caseinates (e.g., all forms including sodium, calcium, potassium caseinates), casein hydrolysates, whey (e.g., all forms including concentrate, isolate, demineralized), whey hydrolysates, milk protein concentrate, and milk protein isolate. Non-limiting examples of suitable plant-based protein include, for example, soy protein (e.g., all forms including concentrate and isolate), pea protein (e.g., all forms including concentrate and isolate), canola protein (e.g., all forms including concentrate and isolate), other plant proteins such as wheat and fractionated wheat proteins, corn and it fractions including zein, rice, oat, potato, peanut, green pea powder, green bean powder, and any proteins derived from beans, lentils, and pulses. Non-limiting examples of suitable animal-based protein include beef, poultry, fish, lamb, seafood and combinations thereof.

Non-limiting examples of suitable fat for the nutritional product include vegetable fat (such as olive oil, corn oil, sunflower oil, rapeseed oil, hazelnut oil, soy oil, palm oil, coconut oil, canola oil, lecithins, and the like), animal fat (such as milk fat) or any combinations thereof.

Non-limiting examples of suitable carbohydrates for the nutritional product (additional to the maltodextrin) include glucose, fructose, corn syrup solids, modified starch, amylose starch, tapioca starch, corn starch or any combinations thereof. In an embodiment, the nutritional product can comprise soluble fiber and/or insoluble fiber. Non-limiting examples of suitable soluble fiber includes fructooligosaccharides, acacia gum, inulin, and mixtures thereof. A non-limiting example of suitable insoluble fiber includes pea outer fiber.

Further aspects and embodiments of the invention are set out in the following lettered paragraphs:

A. A thickening powder formulated for dilution in a diluent to form an aqueous solution that is at least a portion of a nutritional product, the thickening powder comprising an amount of beta-glucan and at least one carrier ingredient that is neutral toward or enhances extensional properties of the nutritional product and provides to the nutritional product a shear viscosity greater than 200 mPas and up to about 2,000 mPas at a shear rate of 50 s$^{-1}$ at 20° C.

B. The thickening powder of paragraph A, wherein the shear viscosity provided by the beta-glucan and at least one carrier ingredient to the nutritional product is greater than 200 mPas and up to about 500 mPas when measured at a shear rate of 50 s$^{-1}$.

C. The thickening powder of paragraph A, wherein the shear viscosity provided by the beta-glucan and at least one carrier ingredient to the nutritional product is from 250 mPas to about 400 mPas when measured at a shear rate of 50 s$^{-1}$.

D. The thickening powder of paragraph A, wherein the at least one carrier ingredient is selected from the group consisting of maltodextrin, isomaltulose, sucrose, lactose, and combinations thereof.

E. The thickening powder of paragraph A, wherein the at least one carrier ingredient is selected from the group consisting of (i) maltodextrin and optionally additionally at least one of sucrose or lactose and (ii) isomaltulose and optionally additionally at least one of sucrose or lactose.

F. The thickening powder of paragraph A, wherein the thickening powder consists of the beta-glucan and the at least one carrier ingredient.

G. The thickening powder of paragraph A, wherein the thickening powder comprises the beta-glucan and the at least one carrier ingredient in a weight ratio of about 10:1 to about 300:1.

H. The thickening powder of paragraph A, wherein the diluting of the thickening powder comprises diluting the thickening powder at a diluent:powder weight ratio up to 200:1, preferably 50:1 to 100:1.

I. The thickening powder of paragraph A, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

J. The thickening powder of paragraph A, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

K. A nutritional product in which at least a portion thereof is made by diluting in a diluent a thickening powder comprising a beta-glucan and at least one carrier ingredient to form an aqueous solution, the nutritional product comprising an amount of the aqueous solution that is neutral toward or enhances extensional properties of the nutritional product and provides to the nutritional product a shear viscosity greater than 200 mPas and up to about 2,000 mPas at a shear rate of 50 $s^{-1}$ at 20° C.

L. The nutritional product of paragraph K, wherein the nutritional product is a liquid, preferably a thin liquid nutritional product.

M. The nutritional product of paragraph K, wherein the shear viscosity provided by the aqueous solution to the nutritional product is greater than 200 mPas and up to about 500 mPas when measured at a shear rate of 50 $s^{-1}$.

N. The nutritional product of paragraph K, wherein the shear viscosity provided by the aqueous solution to the nutritional product is from 250 mPas to about 400 mPas when measured at a shear rate of 50 $s^{1}$.

O. The nutritional product of paragraph K, wherein the amount of the aqueous solution in the nutritional product provides to the nutritional product a relaxation time determined by a Capillary Breakup Extensional Rheometry (CaBER) experiment of about 10 to about 2,000 milliseconds (ms) at 20° C.

P. The nutritional product of paragraph K, wherein the diluting of the thickening powder comprises diluting the thickening powder at a diluent:powder weight ratio up to 200:1, preferably 50:1 to 100:1.

Q. The nutritional product of paragraph K, having at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

R. The nutritional product of paragraph K, in a unit dosage form that is an amount effective for administration of the nutritional product to an individual who suffers from dysphagia to achieve at least one of (i) supplemental nutrition, (ii) hydration and (ii) replacement of one or more full meals.

S. A method of making a nutritional product, the method comprising forming at least a portion of the nutritional product by diluting in a diluent a thickening powder comprising a beta-glucan and at least one carrier ingredient to form an aqueous solution, the aqueous solution is present in the nutritional product in an amount that is neutral toward or enhances the extensional properties of the nutritional product and provides to the nutritional product a shear viscosity greater than 200 mPas and up to about 2,000 mPas at a shear rate of 50 $s^{-1}$ at 20° C.

T. The method of paragraph S, wherein the shear viscosity provided by the aqueous solution to the nutritional product is greater than 200 mPas and up to about 500 mPas when measured at a shear rate of 50 $s^{-1}$.

U. The method of paragraph S, wherein the shear viscosity provided by the aqueous solution to the nutritional product is from 250 mPas to about 400 mPas when measured at a shear rate of 50 $s^{-1}$.

V. The method of paragraph S, wherein the diluting of the thickening powder comprises diluting the thickening powder at a diluent:powder weight ratio up to 200:1, preferably 50:1 to 100:1.

W. The method of paragraph S, wherein the at least one carrier ingredient is selected from the group consisting of maltodextrin, isomaltulose, sucrose, lactose, and combinations thereof.

X. The method of paragraph S, wherein the thickening powder consists of the beta-glucan and the at least one carrier ingredient.

Y. The method of paragraph S, wherein the thickening powder comprises the at least one carrier ingredient and the beta-glucan in a weight ratio of about 10:1 to about 300:1.

Z. The method of paragraph S, wherein the amount of the aqueous solution in the nutritional product provides to the nutritional product a relaxation time determined by a Capillary Breakup Extensional Rheometry (CaBER) experiment of about 10 to about 2,000 milliseconds (ms) measured at 20° C.

AA. The method of paragraph S, wherein the at least one carrier ingredient is selected from the group consisting of (i) maltodextrin and optionally additionally at least one of sucrose or lactose and (ii) isomaltulose and optionally additionally at least one of sucrose or lactose.

BB. The method of paragraph S, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

CC. The method of paragraph S, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

DD. A method of treating a swallowing disorder in an individual having the swallowing disorder, the method comprising orally administering to the individual a nutritional product in which at least a portion thereof is made by diluting in a diluent a thickening powder comprising a beta-glucan and at least one carrier ingredient to form an aqueous solution, the nutritional product comprising an amount of the aqueous solution that is neutral toward or enhances extensional properties of the nutritional product and provides to the nutritional product a shear viscosity greater than 200 mPas and up to about 2,000 mPas at a shear rate of 50 $s^{-1}$ at 20° C.

EE. The method of paragraph DD, wherein the shear viscosity provided by the aqueous solution to the nutritional product is greater than 200 mPas and up to about 500 mPas when measured at a shear rate of 50 $s^{-1}$.

FF. The method of paragraph DD, wherein the shear viscosity provided by the aqueous solution to the nutritional product is from 250 mPas to about 400 mPas when measured at a shear rate of 50 $s^{-1}$.

GG. The method of paragraph DD, wherein the amount of the aqueous solution in the nutritional product provides to the nutritional product a relaxation time determined by a Capillary Breakup Extensional Rheometry (CaBER) experiment of about 10 to about 2,000 milliseconds (ms) at 20° C.

HH. The method of paragraph DD, wherein the at least one carrier ingredient is selected from the group consisting of maltodextrin, isomaltulose, sucrose, lactose, and combinations thereof.

II. The method of paragraph DD, wherein the diluting of the thickening powder comprises diluting the thickening powder at a diluent:powder weight ratio up to 200:1, preferably 50:1 to 100:1.

JJ. The method of paragraph DD, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

KK. The method of paragraph DD, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

LL. A method of promoting safe swallowing of a nutritional product in an individual in need thereof, the method comprising:

adding to the nutritional product an aqueous solution made by diluting in a diluent a thickening powder comprising a beta-glucan and at least one carrier ingredient, the aqueous solution added to the nutritional product in an amount that is neutral toward or enhances extensional properties of the nutritional product and provides to the nutritional product a shear viscosity greater than 200 mPas and up to about 2,000 mPas at a shear rate of 50 $s^{-1}$ at 20° C.; and orally administering to the individual the nutritional product to which the aqueous solution has been added.

MM. The method of paragraph LL, wherein the shear viscosity provided by the aqueous solution to the nutritional product is greater than 200 mPas and up to about 500 mPas when measured at a shear rate of 50 $s^{-1}$.

NN. The method of paragraph LL, wherein the shear viscosity provided by the aqueous solution to the nutritional product is from 250 mPas to about 400 mPas when measured at a shear rate of 50 $s^{-1}$.

OO. The method of paragraph LL, wherein the amount of the aqueous solution in the nutritional product provides to the nutritional product a relaxation time determined by a Capillary Breakup Extensional Rheometry (CaBER) experiment of about 10 to about 2,000 milliseconds (ms) at 20° C.

PP. The method of paragraph LL, wherein the at least one carrier ingredient is selected from the group consisting of maltodextrin, isomaltulose, sucrose, lactose, and combinations thereof.

QQ. The method of paragraph LL, wherein the diluting of the thickening powder comprises diluting the thickening powder at a diluent:powder weight ratio up to 200:1, preferably 50:1 to 100:1.

RR. The method of paragraph LL, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

SS. The method of paragraph LL, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

TT. A method of mitigating a risk of aspiration during swallowing of a nutritional product in an individual in need thereof, the method comprising:

adding to the nutritional product an aqueous solution made by diluting in a diluent a thickening powder comprising a beta-glucan and at least one carrier ingredient, the aqueous solution added to the nutritional product in an amount that is neutral toward or enhances extensional properties of the nutritional product and provides to the nutritional product a shear viscosity greater than 200 mPas and up to about 2,000 mPas at a shear rate of 50 $s^{-1}$ at 20° C.; and orally administering to the individual the nutritional product to which the aqueous solution has been added.

UU. The method of paragraph TT, wherein the shear viscosity provided by the aqueous solution to the nutritional product is greater than 200 mPas and up to about 500 mPas when measured at a shear rate of 50 $s^{-1}$.

VV. The method of paragraph TT, wherein the shear viscosity provided by the aqueous solution to the nutritional product is from 250 mPas to about 400 mPas when measured at a shear rate of 50 $s^{-1}$.

WW. The method of paragraph TT, wherein the amount of the aqueous solution in the nutritional product provides to the nutritional product a relaxation time determined by a Capillary Breakup Extensional Rheometry (CaBER) experiment of about 10 to about 2,000 milliseconds (ms) at 20° C.

XX. The method of paragraph TT, wherein the diluting of the thickening powder comprises diluting the thickening powder at a diluent:powder weight ratio up to 200:1, preferably 50:1 to 100:1.

YY. The method of paragraph TT, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

ZZ. The method of paragraph TT, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

AAA. A method for improving the cohesiveness of a nutritional product, the method comprising forming at least a portion of the nutritional product by diluting in thickening powder comprising a beta-glucan and at least one carrier ingredient to form an aqueous solution, the aqueous solution is present in the nutritional product in an amount that is neutral toward or enhances the extensional properties of the nutritional product and provides to the nutritional product a shear viscosity greater than 200 mPas and up to about 2,000 mPas at a shear rate of 50 $s^{-1}$ at 20° C.

BBB. The method of paragraph AAA, wherein the shear viscosity provided by the aqueous solution to the nutritional product is greater than 200 mPas and up to about 500 mPas when measured at a shear rate of 50 $s^{-1}$.

CCC. The method of paragraph AAA, wherein the shear viscosity provided by the aqueous solution to the nutritional product is from 250 mPas to about 400 mPas when measured at a shear rate of 50 $s^{-1}$.

DDD. The method of paragraph AAA, wherein the amount of the aqueous solution in the nutritional product provides to the nutritional product a relaxation time determined by a Capillary Breakup Extensional Rheometry (CaBER) experiment of about 10 to about 2,000 milliseconds (ms) at 20° C.

EEE. The method of paragraph AAA, wherein the at least one carrier ingredient is selected from the group consisting of maltodextrin, isomaltulose, sucrose, lactose, and combinations thereof.

FFF. The method of paragraph AAA, wherein the diluting of the thickening powder comprises diluting the thickening powder at a diluent:powder weight ratio up to 200:1, preferably 50:1 to 100:1.

GGG. The method of paragraph AAA, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

HHH. The method of paragraph AAA, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

III. A method of making a thickening powder formulated for dilution into at least a portion of a nutritional product, the thickening powder comprising a beta-glucan and at least one carrier ingredient in an amount that is neutral toward or enhances extensional properties of the nutritional product, the method comprising:
extracting the beta-glucan from a source selected from the group consisting of cereal, mushroom, yeast, seaweed, algae and mixtures thereof; and
at least one step selected from the group consisting of (i) adding the at least one carrier ingredient to the source before the extracting of the beta-glucan from the source and (ii) adding the at least one carrier ingredient to the beta-glucan after the extracting of the beta-glucan from the source,
the thickening powder comprises the beta-glucan and the at least one carrier ingredient in an amount that is neutral toward or enhances extensional properties of the nutritional product and provides to the nutritional product a shear viscosity greater than 200 mPas and up to about 2,000 mPas at a shear rate of 50 s$^{-1}$ at 20° C.

JJJ. The method of paragraph III, wherein the nutritional product is an orally administrable nutritional product.

KKK. The method of paragraph III, wherein the at least one carrier ingredient is added to the source before the extracting of the beta-glucan from the source and is not added to the beta-glucan after the extracting of the beta-glucan from the source.

LLL. The method of paragraph III, wherein the at least one carrier ingredient is added to the beta-glucan in a weight ratio of about 10:1 to about 300:1.

MMM. The method of paragraph III, wherein the source comprises oat bran.

NNN. The method of paragraph III, wherein the at least one carrier ingredient is selected from the group consisting of maltodextrin, isomaltulose, sucrose, lactose, and combinations thereof.

OOO. The method of paragraph III, wherein the nutritional product has at least one formulation selected from the group consisting of (i) the diluent is one or more of water, milk, a beverage comprising water and further comprising at least one component additional to the water, a liquid oral nutritional supplement (ONS), or a food product, and the dilution of the thickening powder in the diluent directly forms the nutritional product such that the nutritional product consists essentially of or consists of the diluent, the beta-glucan, and the at least one carrier ingredient; (ii) the dilution of the thickening powder in the diluent to form the aqueous solution is followed by addition of the aqueous solution to at least one other orally administrable composition to form the nutritional product, such that the nutritional product consists essentially of or consists of the diluent, the beta-glucan, the at least one carrier ingredient, and the at least one other orally administrable composition; and (iii) the nutritional product is a ready-to-drink beverage made by packaging the nutritional product after the dilution of the thickening powder in the diluent.

PPP. The method of paragraph III, wherein the thickening powder is diluted from a unit dosage form of the thickening powder that is an amount effective for administration of the nutritional product to an individual who suffers from dysphagia to achieve at least one of (i) supplemental nutrition, (ii) hydration and (ii) replacement of one or more full meals.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of treating a swallowing disorder or mitigating a risk of aspiration during swallowing in an individual having the swallowing disorder, the method comprising orally administering to the individual a nutritional product in which at least a portion thereof is made by diluting a thickening powder comprising a beta-glucan and at least one carrier ingredient in a weight ratio of about 10:1 to about 300:1 with a diluent to form an aqueous solution, wherein the weight ratio of diluent:thickening powder is from 50:1 to 100:1, wherein the diluting the thickening powder comprises diluting a unit dosage form of the thickening powder that is an amount effective for administration of the nutritional product to an individual who suffers from dysphagia to achieve at least one of (i) supplemental nutrition, (ii) hydration and (ii) replacement of one or more full meals, the nutritional product comprising an amount of the aqueous solution that is neutral toward or enhances extensional properties of the nutritional product and provides to the nutritional product a shear viscosity greater than 200 mPas and up to about 2,000 mPas at a shear rate of 50 $s^{-1}$ at 20° C.,
  wherein the at least one carrier ingredient comprises isomaltulose.

2. The method according to claim 1, wherein the shear viscosity provided by the aqueous solution to the nutritional product is greater than 200 mPas and up to about 500 mPas when measured at a shear rate of 50 $s^{-1}$.

3. The method according to claim 1, wherein the amount of the aqueous solution in the nutritional product provides to the nutritional product a relaxation time determined by a Capillary Breakup Extensional Rheometry (CaBER) experiment of about 10 to about 2,000 milliseconds (ms) at 20° C.

4. The method according to claim 1, wherein the diluent is one or more of (1) water, (2) milk, (3) a beverage comprising water and further comprising at least one component additional to the water, (4) a liquid oral nutritional supplement (ONS), or (5) a food product, and the diluting the thickening powder with the diluent directly forms the nutritional product such that the nutritional product consists essentially of the diluent, the beta-glucan, and the at least one carrier ingredient.

5. The method according to claim 1, wherein the diluting the thickening powder with the diluent to form the aqueous solution is followed by addition of the aqueous solution to at least one other orally administrable composition to form the nutritional product, such that the nutritional product consists essentially of the diluent, the beta-glucan, the at least one carrier ingredient, and the at least one other orally administrable composition.

6. The method according to claim 1, wherein the nutritional product is a ready-to-drink beverage made by packaging the nutritional product after the diluting the thickening powder with the diluent.

* * * * *